(12) United States Patent
Chang

(10) Patent No.: US 10,421,312 B1
(45) Date of Patent: Sep. 24, 2019

(54) RETAINING CLIP

(71) Applicant: Teng-Yao Chang, Taichung (TW)

(72) Inventor: Teng-Yao Chang, Taichung (TW)

( * ) Notice: Subject to any disclaimer, the term of this patent is extended or adjusted under 35 U.S.C. 154(b) by 0 days.

(21) Appl. No.: 16/133,220

(22) Filed: Sep. 17, 2018

(30) Foreign Application Priority Data

Jul. 12, 2018 (TW) .............................. 107124072 A

(51) Int. Cl.
*F16B 2/08* (2006.01)
*A45F 5/02* (2006.01)
*B43K 25/02* (2006.01)
*G01B 3/06* (2006.01)

(52) U.S. Cl.
CPC .............. *B43K 25/026* (2013.01); *G01B 3/06* (2013.01); *A45F 5/02* (2013.01); *F16B 2/08* (2013.01)

(58) Field of Classification Search
CPC ......... B43K 25/026; G01B 3/06; A45F 5/021; A45F 5/02; F16B 2/08; Y10T 24/318; Y10T 24/45079
See application file for complete search history.

(56) References Cited

U.S. PATENT DOCUMENTS

| 3,551,965 | A | * | 1/1971 | Gordon | A44B 99/00 |
| | | | | | 2/416 |
| 9,874,236 | B1 | * | 1/2018 | Tien | F16B 2/08 |
| D832,460 | S | * | 10/2018 | Tien | D25/68 |
| 2003/0233739 | A1 | * | 12/2003 | Coffey | A45C 13/20 |
| | | | | | 24/302 |
| 2015/0321813 | A1 | * | 11/2015 | Iannello | A45F 5/02 |
| | | | | | 24/3.1 |
| 2018/0014626 | A1 | * | 1/2018 | Tang | A45F 5/00 |

FOREIGN PATENT DOCUMENTS

| CN | 206087837 U | 4/2017 |
| TW | M541983 U | 5/2017 |
| TW | M550099 U | 10/2017 |
| TW | M571192 U | 12/2018 |

OTHER PUBLICATIONS

Examination Report for TW107124072, dated Apr. 26, 2019, Total of 2 pages.
Search Report for TW107124072, dated Apr. 26, 2019, Total of 1 page.
English Abstract for CN206087837, Total of 1 page.
English Abstract for TWM541983, Total of 1 page.
English Abstract for TWM550099, Total of 1 page.
English Abstract for TWM571192, Total of 1 page.

* cited by examiner

*Primary Examiner* — Robert Sandy
*Assistant Examiner* — Rowland Do
(74) *Attorney, Agent, or Firm* — Lynette Wylie; Apex Juris, Pllc.

(57) ABSTRACT

A retaining clip includes a first strap body and a second strap body. The first strap body includes a first engaging portion. The first engaging portion includes a first abutting surface and a first protrusion. One end of the second strap body is connected with one end of the first strap body. The second strap body includes a ring-shaped portion and a second engaging portion. The second engaging portion is adapted to be detachably engaged with the first engaging portion and includes a second protrusion and a second abutting surface. When the first engaging portion is engaged with the second engaging portion, the first strap body passes through the ring-shaped portion, and the first abutting surface faces the second abutting surface, and the first protrusion faces the second protrusion.

8 Claims, 8 Drawing Sheets

RETAINING CLIP

BACKGROUND OF THE INVENTION

Technical Field

The present invention is related to a connecting member, and more particularly to a retaining clip which is convenient to connect and disconnect.

Description of Related Art

Retaining clips could be engaged with bags, shackles or other accessories for hanging objects. For example, the retaining clip could be engaged with a belt for securing a pouch and a mobile phone to the belt. In addition, in some applications, a strap body is partially sewn on a shoulder strap of a backpack to form a plurality of loops, and the retaining clip could be engaged with the loop to be connected with the shoulder strap of the backpack. The user could hang objects such as a water bottle, a camera, a mobile phone or a video recorder, etc., on the retaining clip and carry these objects conveniently.

However, the conventional structural design of the retaining clip is not good enough, which makes it not easy to connect and disconnect. Therefore, there is still a need to improve the structural design of the retaining clip.

BRIEF SUMMARY OF THE INVENTION

In view of the above, an object of the present invention is to provide a retaining clip which is convenient to connect and disconnect.

To achieve the object mentioned above, the present invention provides a retaining clip. The retaining clip comprises a first strap body and a second strap body. The first strap body includes a first engaging portion; the first engaging portion includes at least one first abutting surface and a first protrusion. One end of the second strap body is connected with one end of the first strap body. The second strap body includes a ring-shaped portion and a second engaging portion; the second engaging portion is adapted to be detachably engaged with the first engaging portion and includes a second protrusion and at least one second abutting surface. When the first engaging portion is engaged with the second engaging portion, the first strap body passes through the ring-shaped portion, and the at least one first abutting surface faces the at least one second abutting surface, and the first protrusion faces the second protrusion. When the first engaging portion and the second engaging portion is disconnected, the first strap body is lifted, which enables the first protrusion to abut against the second protrusion and the at least one second abutting surface to be away from the at least one first abutting surface.

The first strap body has a first surface and a second surface which are opposite to each other, and the second strap body has a third surface and a fourth surface which are opposite to each other; when the first engaging portion is engaged with the second engaging portion, the first surface faces the third surface.

The first engaging portion further includes a first slot; the first slot communicates the first surface and the second surface, and is adapted to receive the second protrusion; the first protrusion is located in the first slot.

A wall of the first slot protrudes to form the first protrusion; the first protrusion is inclined in a direction from the first surface to the second surface.

The wall which the first protrusion protrudes form includes the two first abutting surfaces; the two first abutting surfaces are respectively located at two lateral sides of the first protrusion.

The second engaging portion further includes a second slot; the second slot communicates the third surface and the fourth surface; the second protrusion is located in the second slot.

A top of the second protrusion is higher than the third surface under normal condition A wall of the second slot protrudes to form the second protrusion; the second protrusion includes a notch, which is toward the fourth surface and adjacent to the wall of the second slot.

At least one of the second surface and the fourth surface is provided with a scale.

The second protrusion further includes an inclined surface and two partitions respectively located at two lateral sides of the inclined surface; the inclined surface is adapted to be abutted by the first protrusion; each of the partitions includes the at least one second abutting surface; when a force is applied to the inclined surface, the second protrusion swings toward the fourth surface, which enables the at least one second abutting surface to be away from the at least one first abutting surface.

The advantage of the present invention is that the first strap body and the second strap body could be firmly engaged with each other through the structural design of the first engaging portion and the second engaging portion. In addition, the first engaging portion and the second engaging portion could be disconnected quickly by lifting the first strap body, which enables the first protrusion to abut against the second protrusion and the at least one second abutting surface to be away from the at least one first abutting surface.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
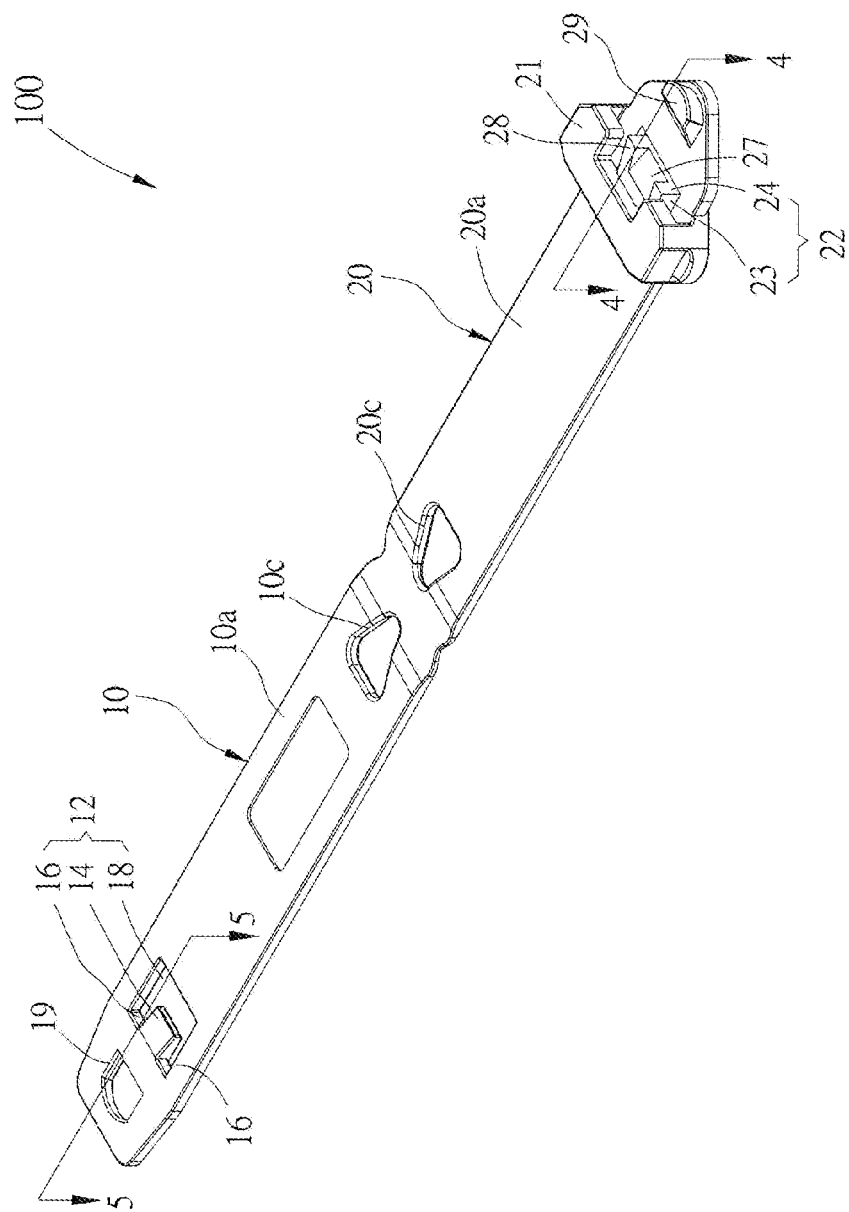
FIG. 1 is a perspective view of a retaining clip according to an embodiment of the present invention.

The following example embodiments and drawings are provided to illustrate the inventive subject matter, its advantages and effects so that it can be clearly understood by persons skilled in the art after reading the disclosure of this specification.

Referring to FIGS. 1 to 5, a retaining clip 100 of an embodiment according to the present invention includes a first strap body 10 and a second strap body 20 which are connected with each other.

The first strap body 10 has a first surface 10a and a second surface 10b which are opposite to each other, and includes a first engaging portion 12. The first engaging portion 12 includes a first protrusion 14 and at least one first abutting surface 16. In this embodiment, the first engaging portion 12 further includes a first slot 18, wherein the first protrusion 14 is located in the first slot 18. More specifically, in this embodiment, a wall of the first slot 18 protrudes to form the first protrusion 14, and preferably, the first protrusion 14 is slightly inclined in a direction from the first surface 10a to the second surface 10b. In addition, in this embodiment, the wall which the first protrusion 14 protrudes from includes two first abutting surfaces 16 respectively located at two lateral sides of the first protrusion 14.

One end of the second strap body 20 is connected with one end of the first strap body 10. The second strap body 20 has a third surface 20a and a fourth surface 20b which are opposite to each other, and includes a ring-shaped portion 21 and a second engaging portion 22. The ring-shaped portion 21 is adapted to be passed through by the first strap body 10, and the second engaging portion 22 includes a second protrusion 23 and at least one second abutting surface 24. In this embodiment, the second engaging portion 22 further includes a second slot 25 communicating the third surface 20a and the fourth surface 20b. The second protrusion 23 is located in the second slot 25. More specifically, in this embodiment, a wall of the second slot 25 protrudes to form the second protrusion 23, and preferably, the second protrusion 23 includes a notch 26, which is toward the fourth surface 20b and adjacent to the wall of the second slot 25. With the structural design of the notch 26, it is favorable for the second protrusion 23 to bend when a force is applied thereto, for example, the second protrusion 23 bends in a direction from the third surface 20a to the fourth surface 20b.

Figure 4:
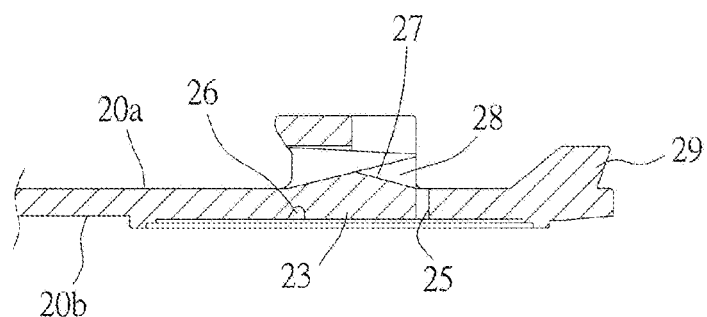
FIG. 4 is a cross-sectional view of the retaining clip of FIG. 1 as viewed along line 4-4 of FIG. 1.
Figure 5:
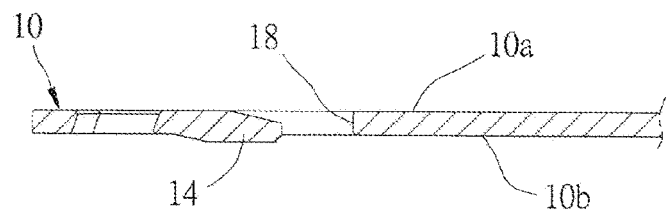
FIG. 5 is a cross-sectional view of the retaining clip of FIG. 1 as viewed along line 5-5 of FIG. 1.

In addition, referring to FIGS. 1 and 4, in this embodiment, the second protrusion 23 includes an inclined surface 27 toward the third surface 20a. The inclined surface 27 is adapted to be abutted by the first protrusion 14. Moreover, the second protrusion 23 includes two partitions 28 respectively located at two lateral sides of the inclined surface 27, each of which includes one second abutting surface 24.

Figure 2:
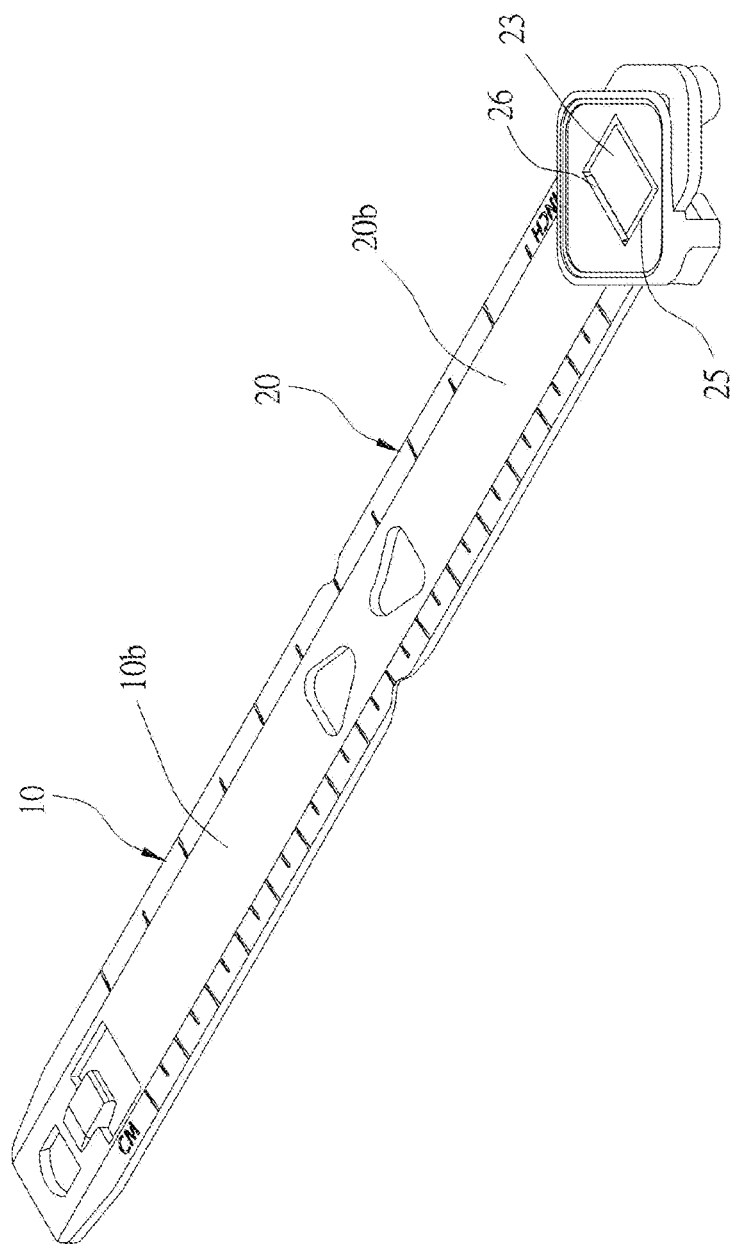
FIG. 2 is a perspective view of the retaining clip of FIG. 1 from another angle of view.
Figure 3:
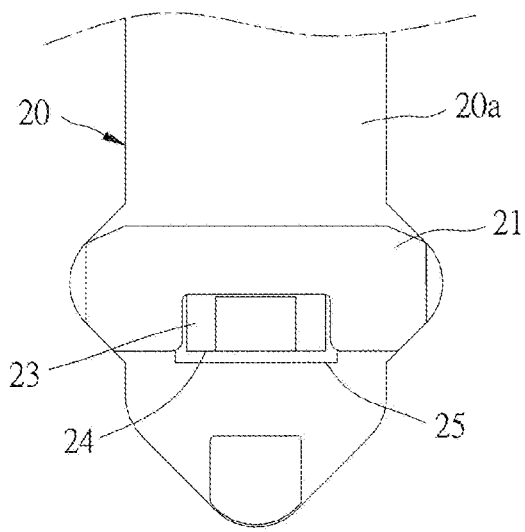
FIG. 3 is a partial enlarged top view of the second engaging portion.

Referring to FIG. 2, at least one of the second surface 10b of the first strap body 10 and the fourth surface 20b of the second strap body 20 could be provided with a scale. In this embodiment, each of the second surface 10b and the fourth surface 20b is provided with a scale (e.g. in centimeters or inches). In this way, when the retaining clip 100 is in an expanded state, a user could utilize the retaining clip 100 as a ruler to measure a length.

Figure 6:
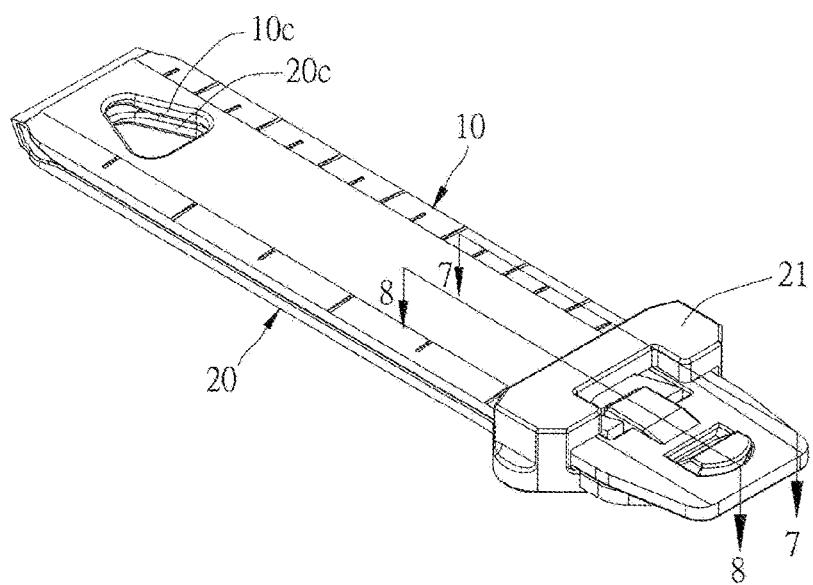
FIG. 6 is a perspective view of the retaining clip showing that the first engaging portion is engaged with the second engaging portion.

Referring to FIGS. 1 and 6, in an embodiment, each of the first strap body 10 and the second strap body 20 is further provided with a through hole 10c and 20c. When the first strap body 10 and the second strap body 20 are joined to each other, the two through holes 10c and 20c could overlap (as shown in FIG. 6) for hanging objects.

Referring to FIG. 1, in this embodiment, one end of the first strap body 10 away from the second strap body 20 is further provided with a positioning hole 19, and one end of the second strap body 20 away from the first strap body 10 is further provided with a positioning post 29. The positioning post 29 protrudes from the second surface 20a and is adapted to be passed through by the positioning hole 19 to be engaged with the positioning hole 19. Preferably, the positioning post 29 is inclined and protrudes in a direction away from the first strap body 10 (as shown in FIG. 4).

Referring to FIGS. 1 and 6 to 8, when the user intends to engage the retaining clip 100 with a loop (not shown), the user could pass one end of the first strap body 10 or one end of the second strap body 20 through the loop, and then bend or fold the first strap body 10 or the second strap body 20 in a direction where the first surface 10a of the first strap body 10 faces the third surface 20a of the second strap body 20 so as to pass one end of the first strap body 10 through the ring-shaped portion 21 of the second strap body 20 such that the positioning hole 19 of the first strap body 10 could be tied to and engaged with the positioning post 29 of the second strap body 20. Meanwhile, the first protrusion 14 of the first engaging portion 12 of the first strap body 10 would face the second protrusion 23, and the first abutting surface 16 would face the second abutting surface 24. Under certain circumstances, the first protrusion 14 would abut against the second protrusion 23, and the first abutting surface 16 would abut against the second abutting surface 24. In this embodiment, referring to FIGS. 7 and 8, the first protrusion 14 abuts against the inclined surface 27 of the second protrusion 23, and the two second abutting surfaces 24 of the two partitions 28 respectively abut against the two first abutting surfaces 16 of the two lateral sides of the first protrusion 14.

With the aforementioned design, the first strap body 10 and the second strap body 20 of the retaining clip 100 could be firmly engaged with each other for hanging objects.

Figure 9:
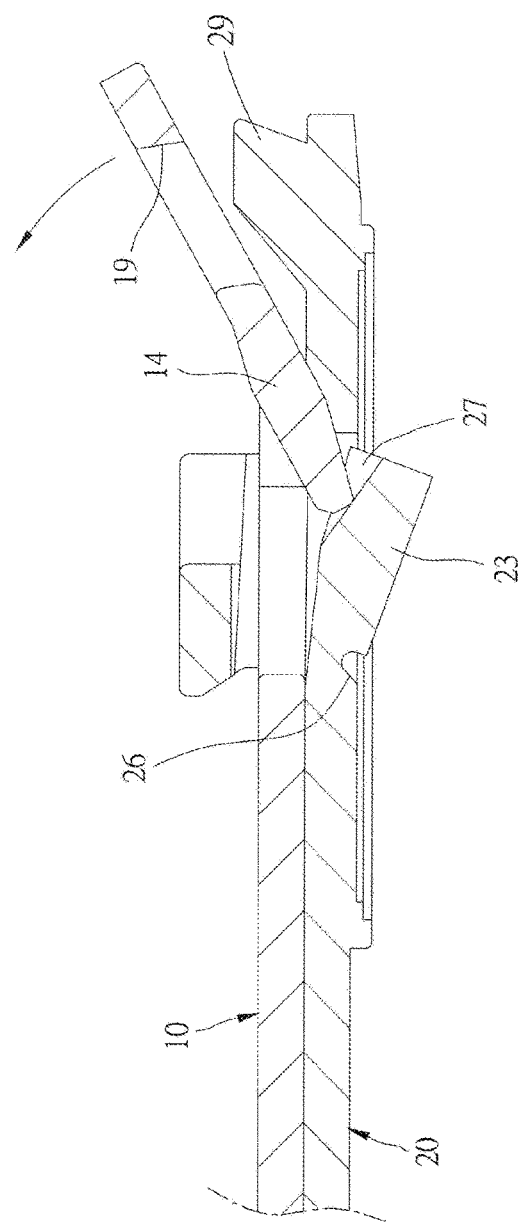
FIG. 9 is similar to FIG. 7 and shows that the first protrusion abuts against the second protrusion when a force is applied to the first strap body.
Figure 10:
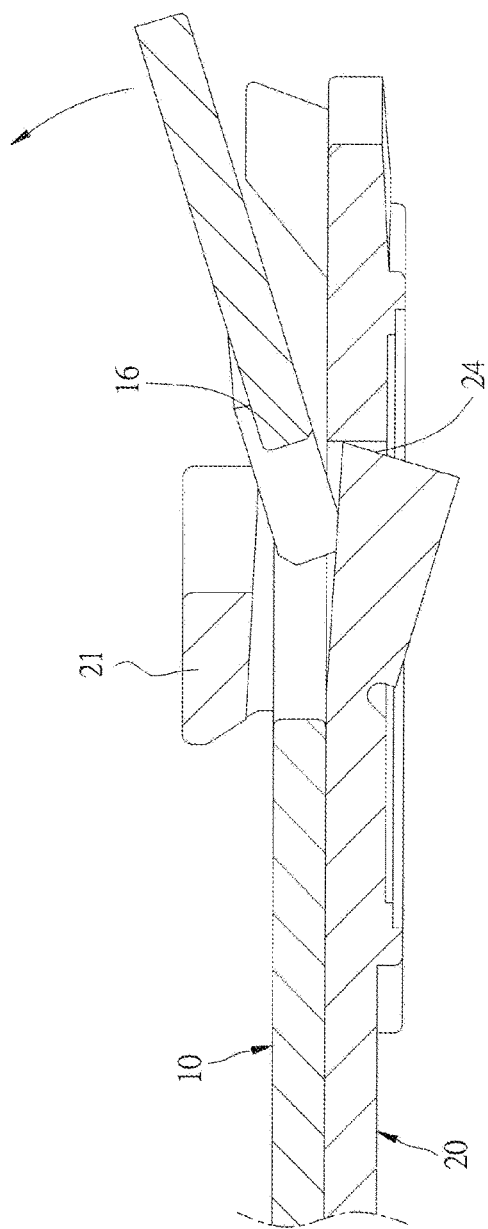
FIG. 10 is similar to FIG. 8 and shows that the second abutting surface is away from the first abutting surface.

Moreover, when the user intends to disconnect the first engaging portion 12 and the second engaging portion 22, the user could move and lift one end of the first strap body 10 to slightly bend the first strap body 10 and detach the positioning hole 19 of the first strap body 10 from the positioning post 29 of the second strap body 20. Meanwhile, the first protrusion 14 of the first strap body 10 would abut against and provide a force to the second protrusion 23 of the second strap body 20, which enables the second protrusion 23 to swing from the second slot 25 toward the fourth surface 20b of the second strap body 20. For example, referring to FIGS. 7 and 9, after being abutted by the first protrusion 14, the second protrusion 23 swings downward as illustrated in FIG. 9, and further referring to FIG. 10, the two second abutting surfaces 24 of the two second protrusions 23 are simultaneously away from the two first abutting surfaces 16 of the first strap body 10 such that the user could disconnect the first engaging portion 12 from the second engaging portion 22 by slightly pushing the first strap body 10 leftward as illustrated in FIG. 10. The user could pull the first strap body 10 out of the ring-shaped portion 21 of the second strap body 20, and unfold the first strap body 10 and the second strap body 20 into the expanded state as illustrated in FIG. 1.

With the aforementioned design, the user could lift one end of the first strap body 10 with one hand, which enables the first protrusion 14 to abut against the second protrusion 23 and the first abutting surface 16 to leave the second abutting surface 24, and then the user could slightly pull the first strap body 10 out of the ring-shaped portion 21, whereby to remove the retaining clip 100 from the loop easily.

Figure 7:
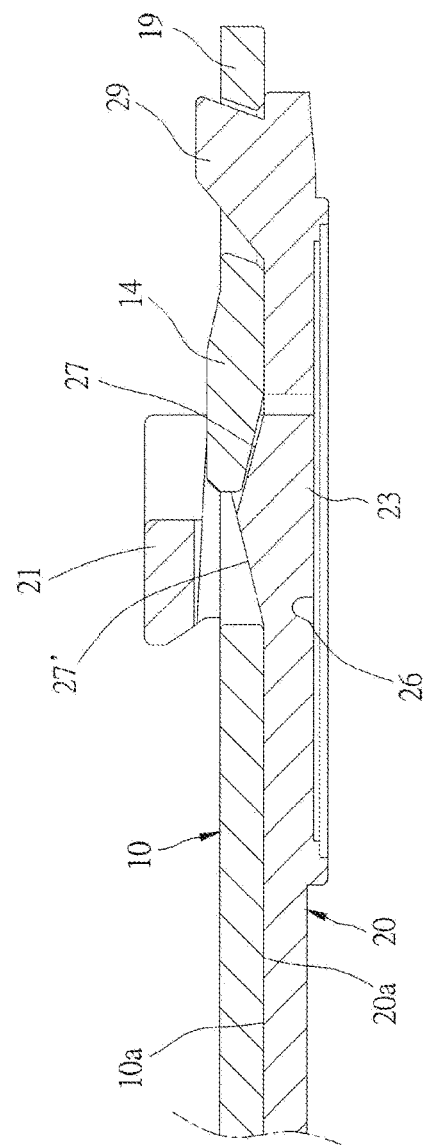
FIG. 7 is a cross-sectional view of the retaining clip of FIG. 6 as viewed along line 7-7 of FIG. 6.
Figure 8:
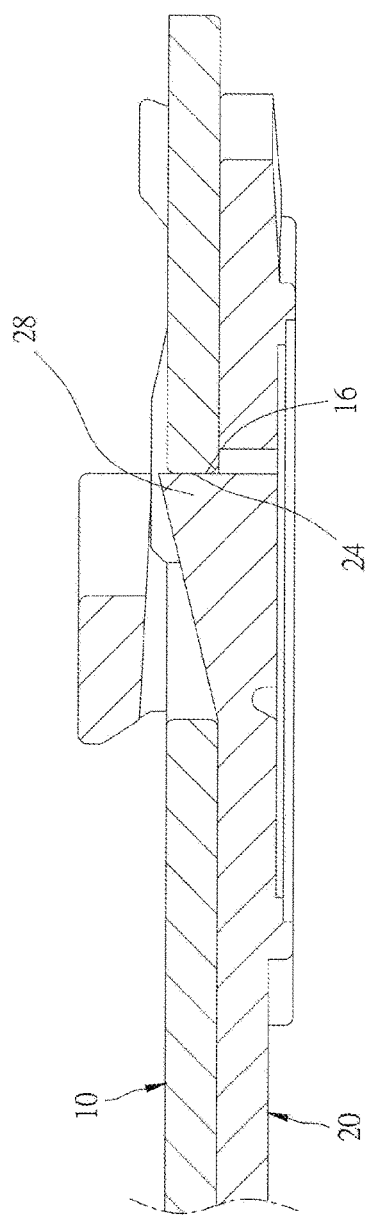
FIG. 8 is a cross-sectional view of the retaining clip of FIG. 6 as viewed along line 8-8 of FIG. 6.

Further referring to FIG. 7, the second protrusion 23 is formed with another inclined surface 27'. The inclined surface 27' is inclined in a direction opposite to the inclined surface 27. With the design of the inclined surface 27', it is favorable to pass the first strap body 10 through the ring-shaped portion 21.

It must be pointed out that the embodiments described above are only some embodiments of the present invention. All equivalent structures which employ the concepts disclosed in this specification and the appended claims should fall within the scope of the present invention.

What is claimed is:

1. A retaining clip, comprising:
   a first strap body including a first engaging portion, wherein the first engaging portion includes at least one first abutting surface and a first protrusion; and
   a second strap body, wherein one end of the second strap body is connected with one end of the first strap body; the second strap body includes a ring-shaped portion and a second engaging portion, wherein the second engaging portion is adapted to be detachably engaged with the first engaging portion and includes a second protrusion and at least one second abutting surface; when the first engaging portion is engaged with the second engaging portion, the first strap body passes through the ring-shaped portion, and the at least one first abutting surface faces the at least one second abutting surface, and the first protrusion faces the second protrusion; when the first engaging portion and the second engaging portion is disconnected, the first strap body is lifted, which enables the first protrusion to abut against the second protrusion and the at least one second abutting surface to be away from the at least one first abutting surface;
   wherein the first strap body has a first surface and a second surface which are opposite to each other, and the second strap body has a third surface and a fourth surface which are opposite to each other; when the first engaging portion is engaged with the second engaging portion, the first surface faces the third surface;
   wherein the first engaging portion further includes a first slot; the first slot communicates with the first surface and the second surface, and is adapted to receive the second protrusion; the first protrusion is located in the first slot.

2. The retaining clip of claim 1, wherein a wall of the first slot protrudes to form the first protrusion; the first protrusion is inclined in a direction from the first surface to the second surface.

3. The retaining clip of claim 1, wherein the wall which the first protrusion protrudes form includes the two first abutting surfaces; the two first abutting surfaces are respectively located at two lateral sides of the first protrusion.

4. The retaining clip of claim 1, wherein at least one of the second surface and the fourth surface is provided with a scale.

5. A retaining clip, comprising:
   a first strap body including a first engaging portion, wherein the first engaging portion includes at least one first abutting surface and a first protrusion; and
   a second strap body, wherein one end of the second strap body is connected with one end of the first strap body; the second strap body includes a ring-shaped portion and a second engaging portion, wherein the second engaging portion is adapted to be detachably engaged with the first engaging portion and includes a second protrusion and at least one second abutting surface; when the first engaging portion is engaged with the second engaging portion, the first strap body passes through the ring-shaped portion, and the at least one first abutting surface faces the at least one second abutting surface, and the first protrusion faces the second protrusion; when the first engaging portion and the second engaging portion is disconnected, the first strap body is lifted, which enables the first protrusion to abut against the second protrusion and the at least one second abutting surface to be away from the at least one first abutting surface;
   wherein the first strap body has a first surface and a second surface which are opposite to each other, and the second strap body has a third surface and a fourth surface which are opposite to each other; when the first engaging portion is engaged with the second engaging portion, the first surface faces the third surface;
   wherein the second engaging portion further includes a second slot; the second slot communicates with the third surface and the fourth surface; the second protrusion is located in the second slot.

6. The retaining clip of claim 5, wherein a wall of the second slot protrudes to form the second protrusion; the second protrusion includes a notch, which is toward the fourth surface and adjacent to the wall of the second slot.

7. The retaining clip of claim 5, wherein the second protrusion further includes an inclined surface and two partitions respectively located at two lateral sides of the inclined surface; the inclined surface is adapted to be abutted by the first protrusion; each of the partitions includes the at least one second abutting surface; when a force is applied to the inclined surface, the second protrusion swings toward the fourth surface, which enables the at least one second abutting surface to be away from the at least one first abutting surface.

8. The retaining clip of claim 5, wherein at least one of the second surface and the fourth surface is provided with a scale.

* * * * *